US 6,523,667 B1

(12) United States Patent
Dingeldein et al.

(10) Patent No.: US 6,523,667 B1
(45) Date of Patent: Feb. 25, 2003

(54) INTERMEDIATE DISCHARGE FOR AN ENCLOSED ROLLER BELT CONVEYOR ASSEMBLY

(75) Inventors: Mark S. Dingeldein, Milford, IN (US); Stephen M. Ginter, Warsaw, IN (US)

(73) Assignee: CTB IP, Inc., Wilmington, DE (US)

( * ) Notice: Subject to any disclaimer, the term of this patent is extended or adjusted under 35 U.S.C. 154(b) by 0 days.

(21) Appl. No.: 09/836,516

(22) Filed: Apr. 17, 2001

(51) Int. Cl.⁷ .............................................. B65G 47/10
(52) U.S. Cl. ...................................................... 198/367
(58) Field of Search ................. 198/367, 637, 198/364

(56) References Cited

U.S. PATENT DOCUMENTS

| | | | | |
|---|---|---|---|---|
| 2,537,005 A | * | 1/1951 | Brown et al. | 198/367 |
| 2,699,249 A | * | 1/1955 | Milliken et al. | 198/367 |
| 3,153,477 A | * | 10/1964 | Tipton | 198/364 |
| 4,320,825 A | * | 3/1982 | Buschbom | 198/364 |
| 5,351,802 A | * | 10/1994 | Wilson | 198/367 |
| 6,039,170 A | * | 3/2000 | Clark | 198/364 |

OTHER PUBLICATIONS

IS RollerFlo,Intermediate Discharge Brochure, pp. 16–17, Jul. 27, 2000.
Hi RollerR, Enclosed Movable Tripper Brochure (6 pages).

* cited by examiner

Primary Examiner—Joseph E. Valenza
(74) Attorney, Agent, or Firm—Harness, Dickey & Pierce, P.L.C.

(57) ABSTRACT

An intermediate discharge assembly to remove granular material from a conveyor belt used in an enclosed roller belt conveyor assembly. The intermediate discharge assembly includes a first pair of leading and trailing pulleys, a second pair of leading and trailing pulleys and a plow. The first pair of leading and trailing pulleys supports the conveyor belt in a substantially concave manner. The second pair of leading and trailing pulleys supports the conveyor belt in a substantially flat manner. The plow is positioned between the first and second pairs of leading and trailing pulleys. The plow is operable to remove the granular material from the conveyor belt when the second pair of leading and trailing pulleys supports the conveyor belt and the plow is positioned atop the conveyor belt, such that the granular material is removed from the conveyor belt.

27 Claims, 9 Drawing Sheets

INTERMEDIATE DISCHARGE FOR AN ENCLOSED ROLLER BELT CONVEYOR ASSEMBLY

BACKGROUND OF THE INVENTION

1. Field of the Invention

The present invention relates generally to conveyor assemblies and, more particularly, to an intermediate discharge for an enclosed roller belt conveyor assembly.

2. Discussion of the Related Art

In various industries, such as those involving agriculture, manufacturing, commercial and industrial applications, it is often necessary to store and transport relatively large amounts of granular materials. In agriculture, for example, it is often necessary to store and transfer substantial quantities of grain from one location to another location. In such instances, grain conveyor assemblies are generally used to move the granular material or grain to and from storage silos or elevators at a first location to grain transportation vehicles at a second location, such as conveyors, grain transport barges, freight trains, trucks, etc.

Grain conveyor assemblies or belt conveyors generally employ a continuous conveyor belt that carries the grain on an upper surface of the conveyor belt. This continuous belt typically rides atop a set of rollers or pulleys. These pulleys include end pulleys which are used for driving the belt and intermediate pulleys which have a V-shape contour to retain and transport the grain, via the belt. The bulk material or grain is generally supplied to the belt conveyor at an inlet and discharged from the belt conveyor at an outlet of the conveyor assembly.

When needed, there are two primary devices used in the bulk material handling industry to remove product or granular material from a belt conveyor at intermediate locations along its length. These devices are known as trippers or plows, which can be designed as stationary or moveable members. Typically these types of applications have been designed and used with open style belt conveyors over the years. The use of open belt conveyors is common throughout many industries. However, some industries are placing more of a restraint on the use of open systems due to safety and environmental concerns. Other methods to accomplish the same purpose as intermediate discharge is by using multiple conveyor systems at each point where a discharge is required. This method, however, is a very expensive alternative and also requires more space to accommodate for the multiple conveyors.

With more safety, environmental and ecological restraints being placed on the belt conveyor industry, the enclosed roller belt conveyor has become more widely accepted and required in handling certain products in many industries. The enclosed roller belt conveyor is designed with an encasement surrounding the belt and mechanical components, thus providing an enclosure for transporting material and confining the airborne particles. These airborne particles caused from transporting and transferring products can have adverse effects. For example, in the grain industry, the containment of dust substantially reduces the risk of explosions. Also, at port facilities, the loading of ships with the enclosed belt eliminates the airborne dust particles that can negatively effect the environment. Additionally, the belt support rollers are within the enclosure and remove the risk of injury from these rotating components and moving belt. Therefore, this style of conveyor addresses the safety, environmental and ecological concerns related to many industries.

The dilemma facing the designers of enclosed roller belt conveyor systems is to incorporate features of the open style belt conveyor without the boundary of the enclosure, while maintaining the concerns discussed above. For example, one type of enclosed intermediate discharged system employs a belt conveyor assembly which ramps up or elevates the belt progressively over an extended length up to a discharge area where the belt is routed about a lower set of pulleys creating a stepped shape along the belt conveyor. At this stepped region, a tiltable bucket or direction member captures the bulk material dropping from the elevated portion of the belt conveyor to the lower portion of the belt conveyor to provide an intermediate discharge in this stepped area. If this discharge member or bucket is again actuated, the bulk material is simply dropped along the belt conveyor to a final outlet destination without having an intermediate discharge.

However, this type of system has many disadvantages. For example, by ramping up the conveyor assembly, this requires additional power output to drive the overall conveyor assembly and also requires a longer intermediate discharge region up to and generally over forty (40) feet long, which is elevated from a beginning point to an ending point of over generally four (4) feet. This prevents having several intermediate discharges positioned relatively close to one another, thereby, in some instances, requiring multiple conveyor assemblies to achieve multiple intermediate discharges. Additionally, these types of systems generally may not be retrofitted with existing conveyor belt assemblies due to the size and overall construction involved, thereby adding additional costs should it be desired to have an intermediate discharge along a conveyor assembly. Finally, these types of conveyor assemblies may only be driven in a single direction because of the step formed in the conveyor, thereby inhibiting a bi-directional operation of the conveyor assembly.

What is needed then is an improved intermediate discharge for an enclosed roller belt conveyor assembly, which does not suffer from the above-mentioned disadvantages. This will, in turn, enable bi-directional movement of the belt conveyor; reduce the power consumption generally required for intermediate discharge operations; provide a more compact and versatile intermediate discharge assembly, which can be retrofitted to existing conveyor belt assemblies; and provide an intermediate discharge assembly that is shorter in length and narrower in width to enable multiple intermediate discharges within a smaller space without having to configure the conveyor belt in a stepped configuration. It is, therefore, an object of the present invention to provide such an intermediate discharge for an enclosed roller belt conveyor assembly.

SUMMARY OF THE INVENTION

In accordance with the teachings of one preferred embodiment of the present invention, an intermediate discharge assembly to remove granular material from a conveyor belt used in an enclosed roller belt conveyor assembly includes a first pair of leading and trailing pulleys, a second pair of leading and trailing pulleys and a plow. The first pair of leading and trailing pulleys is operable to support the conveyor belt in a substantially concave manner. The second pair of leading and trailing pulleys is operable to support the conveyor belt in a substantially flat manner. The plow is positioned between the first and second pairs of leading and trailing pulleys and is operable to remove the granular material from the conveyor belt. When the first pair of leading and trailing pulleys supports the conveyor belt, the plow is elevated above the conveyor belt, such that the granular material passes through the intermediate discharge assembly. When the second pair of leading and trailing pulleys supports the conveyor belt, the plow is positioned atop the substantially flat conveyor belt, such that the granular material is removed from the conveyor belt.

In another preferred embodiment, the intermediate discharge assembly to remove granular material from a conveyor belt used in an enclosed roller belt conveyor assembly includes a plow support frame platform and a plow. The plow support frame platform is positioned below the conveyor belt and is operable to be located in a first position and a second position. The plow is positioned above the conveyor belt and is operable to be located in a first position and a second position. When the plow support frame platform and the plow are each located in the first position, the conveyor belt passes over the plow support frame platform and the granular material passes through the intermediate discharge assembly. When the plow support frame platform and the plow are located in the second position, the plow support frame platform is elevated from the first position to substantially support the conveyor belt and the plow is lowered atop the conveyor belt to substantially remove the granular material from the conveyor belt.

In yet another preferred embodiment, a method to remove granular material at an intermediate location along a conveyor belt used in an enclosed roller belt assembly is provided. This method includes locating the conveyor belt at a first position to enable the granular material to pass by an intermediate location. This method further includes elevating the conveyor belt to a second position at the intermediate location to permit removal of the granular material at the intermediate location.

Use of the present invention provides an intermediate discharge assembly to remove granular material from a conveyor belt used in an enclosed roller belt conveyor assembly. As a result, the aforementioned disadvantages associated with existing conveyor assemblies have been substantially reduced or eliminated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENTS

The following description of the preferred embodiment concerning an intermediate discharge for an enclosed roller belt conveyor assembly is merely exemplary in nature and is not intended to limit the invention, its application, or uses. Moreover, while the present invention is described in detail below with reference to grain conveyor assemblies, the present invention is clearly not limited to only grain conveyor assemblies and may include any type of conveyor assembly to transport any type of bulk material.

Figure 1:
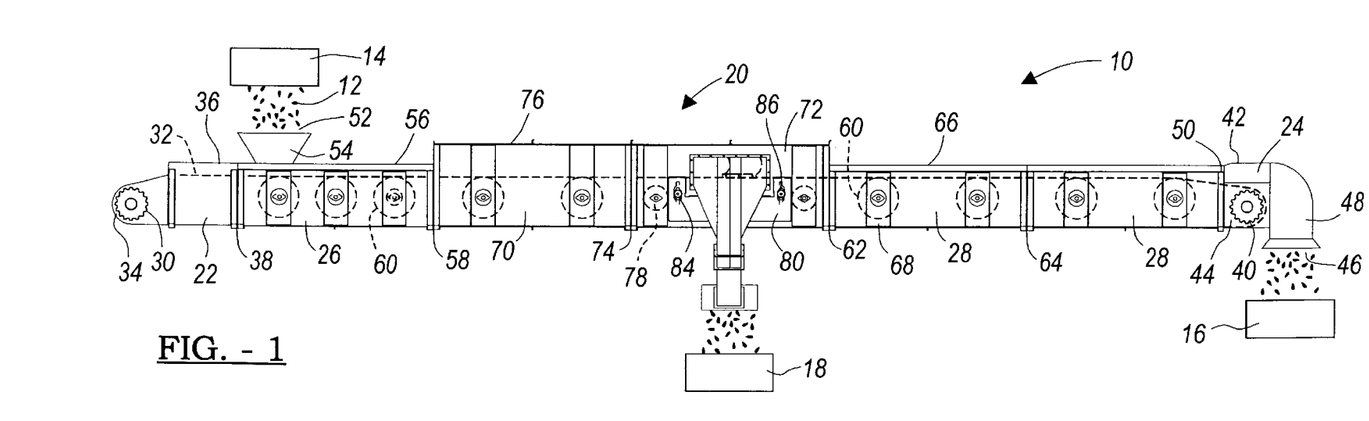
FIG. 1 is a side elevational view of an enclosed roller belt conveyor assembly delivering granular material from a first location to a second location according to the teachings of the present invention.
Figures 2, 3:
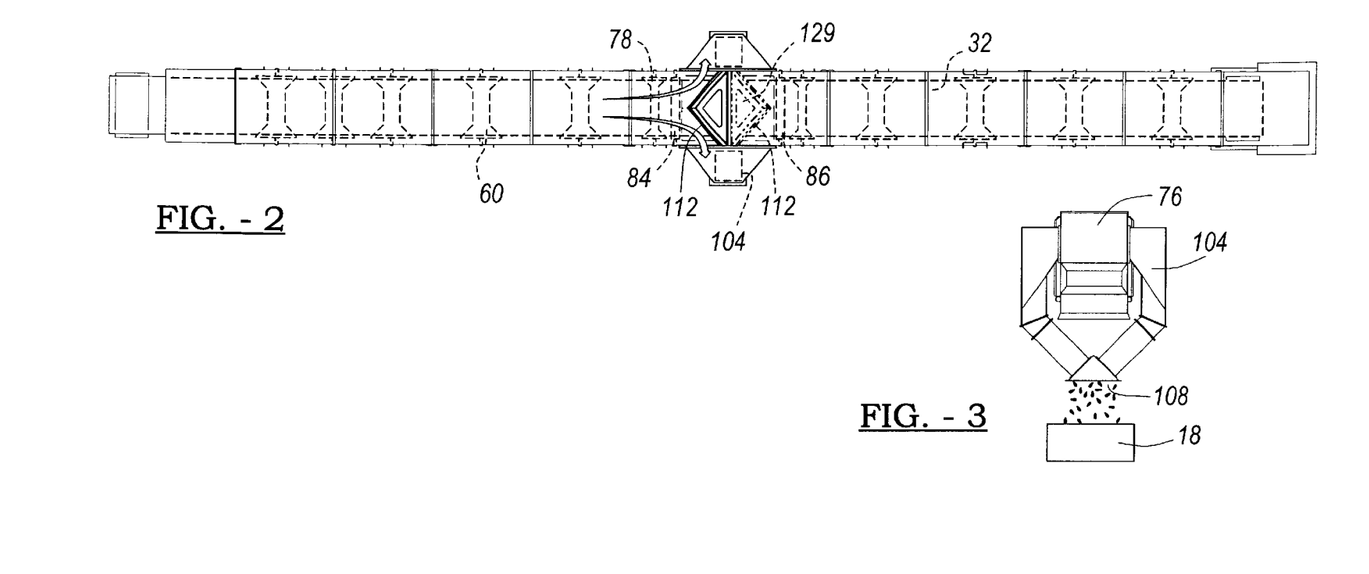
FIG. 2 is a top view of the belt conveyor in the enclosed roller belt conveyor assembly illustrating the material flow along an intermediate discharge according to the teachings of the present invention.
FIG. 3 is an end view illustrating the intermediate discharge along the intermediate discharge section according to the teachings of the present invention.

Referring to FIGS. 1–3, a grain conveyor assembly 10 for transporting granular material or grain 12 from a first location 14 to a second location 16 is shown. The grain conveyor assembly 10 may also deliver the grain 12 to an intermediate location 18, via an intermediate discharge section 20, further discussed herein. The grain conveyor assembly 10 includes a telescopic tail section 22, a head section 24, an intermediate inlet section 26, intermediate sections 28, with the intermediate discharge section 20 positioned therebetween. It should be noted that while a pair of intermediate sections 28 are shown in FIG. 1, along with a single intermediate discharge section 20, those skilled in the art will appreciate that depending on the particular configuration desired, multiple intermediate inlet sections 26, intermediate discharge sections 20 and intermediate sections 28 may be included to lengthen the conveyor assembly 10, as well as to provide additional inputs and outputs along the length of the conveyor assembly 10. Moreover, in conveyor assemblies, which are over about two-hundred feet (200 ft) in length, a gravity take-up tail section may be employed.

The telescopic tail section 22 is a conventional telescopic tail section as is known in the grain conveyor art and is preferably a Brock type telescopic tail section available from Chore-Time Brock of Milford, Ind. The telescopic tail section 22 includes a winged tail pulley 30 in which a conveyor belt 32 rides. The winged tail pulley 30 includes a re-loading feature which is well known in the art that is capable reloading any grain which may be displaced from the conveyor belt 32, via paddles 34 located about the circumference of the tail pulley 30.

The telescopic tail section 22 is substantially housed within a sealed outer housing 36, thereby protecting the grain 12 being transported on the conveyor belt 32 from the environment. The winged tail pulley 30 is operable to be telescopically adjusted between the range of about one inch (1") to about thirty inches (30") along the longitudinal axis of the conveyor assembly 10 using conventional telescopic adjustment techniques, thereby enabling tension adjustment on the conveyor belt 32. The overall length of the telescopic tail section is about six feet-three inches (6'–3") and may be separated from the intermediate inlet section 22 along an abutting joint or seam 38.

The head section 24 is used for driving the conveyor belt 32 along the conveyor assembly 10, via a head pulley 40. Here again, the head section 24 is a conventional head section for a grain conveyor assembly and is preferably a Brock head section also available from Chore-Time Brock of Milford, Ind. The head pulley 40 is driven by a High Torque Drive (HTD) which includes a reduction gear box in communication with the head pulley 40, via a belt drive, or other appropriate drive. The head pulley 40 is substantially cylindrical in shape, such that the conveyor belt 32 is driven along a substantially planar surface. The structure of the head section 24 includes a sealed housing 42 having an access panel 44 and a discharge outlet 46 extending from a discharge chute 48. As the head pulley 40 is rotated clockwise at a speed between about 0–200 revolutions per minute (RPM), up to about 60,000 BU/HR (bushels per hour) of grain 12 is delivered from the discharge chute 48 at the discharge outlet 46 to the second location 16. The second location 16 may be a grain barge, freight train, grain hauling trucks etc. Alternatively, the second location 16 may also be an additional grain conveyor assembly or other storage facilities, such as a grain elevator. The head section 24 is about four feet (4') in length and is joined to one of the intermediate sections 28, via an abutting joint or seam 50.

The intermediate inlet section 26 is operable to receive the grain 12 from the first location 14, via an inlet opening 52 of an inlet duct 54. Here again, the first location 14 will generally be a grain storage facility such as a grain elevator or grain silo or other storage facilities for fertilizer, seed, etc. However, the first location 14 may also be a grain hauling vehicle as noted with respect to the second location 16, as well as an additional conveyor assembly. The inlet duct 52 is coupled to a sealed housing 56 which houses the intermediate inlet section 26. The intermediate inlet section 26 is coupled to the telescopic tail section 22, via the abutting joint 38 and to the intermediate discharge section 20, via an abutting joint 58. The intermediate inlet section 26 is about eight feet (8') in length and includes at least three idler pulleys 60 spaced about three feet (3') apart from one another along the sealed housing 56. The idler pulleys 60 are preferably the idler pulleys disclosed in U.S. Ser. No. 09/099,971, filed Jun. 19, 1998, entitled "Idler Pulley For A Conveyor Assembly", which is hereby incorporated by reference. The use of three idler pulleys 60 positioned in relative close proximity to one another (i.e., approximately three feet (3)) provides additional support as the grain 12 drops onto the conveyor belt 32, via the inlet duct 52. This substantially evenly dissipates the force generated by the granular material 12 flowing upon the conveyor belt 32.

The first intermediate section 28 is coupled to the intermediate discharge section 20, via an abutting joint 62 and coupled to adjacent intermediate section 28, via an abutting joint 64. Here again, each intermediate section 28 includes an enclosed housing 66 to protect the grain 12 from the environment and the environment from dust and dirt as the grain 12 is transported along the conveyor belt 32. Each intermediate section 28 is about eight feet (8') in length and includes two (2) idler pulleys 60 which are positioned at about four feet (4') apart from one another. In this way, by connecting multiple intermediate sections 28, each idler pulley 60 is generally spaced at about four feet (4') apart from one another, which is sufficient to support the load of the grain 12 upon the conveyor belt 32, except at the inlet duct 52 where the idler pulleys 60 include the three pulleys 60 within a total length of about eight feet (8'), providing further support for the grain 12 as it is dropped or flows upon the conveyor belt 32.

Each idler pulley 60 in the intermediate inlet section 26 and intermediate sections 28 are secured within its respective housing, via adjustable bearing stiffness plates 68 having adjustment slots (not shown). The adjustment slots enable the bearing stiffness plates 68 to be moved along the longitudinal axis of the conveyor assembly 10 either fore or aft by about 0.75 inches, independently on either side of the idler pulley 60. In this way, the idler pulley 60 can be positioned substantially perpendicular to the conveyor belt 32 or angled a few degrees relative to this perpendicular position, which enables belt training capability for the conveyor belt 32. In other words, upon adjusting the bearing stiffness plates 68, either fore or aft on either side of the idler pulley 60, a tension and frictional force is applied to the conveyor belt 32 as it freely rolls along the idler pulley 60. This enables the conveyor belt 32 to be adjusted to the right or left of the longitudinal center line of the idler pulley 60 to substantially center the conveyor belt 32 along the entire conveyor assembly 10. This adjustment provides further versatility should it be required to form the conveyor assembly 10 along an arcuate curve versus along a straight axial path.

Turning now to FIGS. 4–7, the intermediate discharge section 20 according to the teachings of the present invention is shown in further detail. The intermediate discharge section 20 enables various discharge locations intermediate the outlet 46 essentially anywhere along the conveyor assembly 10. The intermediate discharge section 20 may also be easily retrofitted to any existing conveyor assemblies 10 simply by separating abutting joints and installing the intermediate discharge section 20 where an intermediate discharge is desired. Here again, it should be noted that multiple intermediate discharge sections 20 may be dispersed along the length of the conveyor assembly 10 to provide multiple intermediate discharges at multiple intermediate discharge locations 18.

Figure 4:
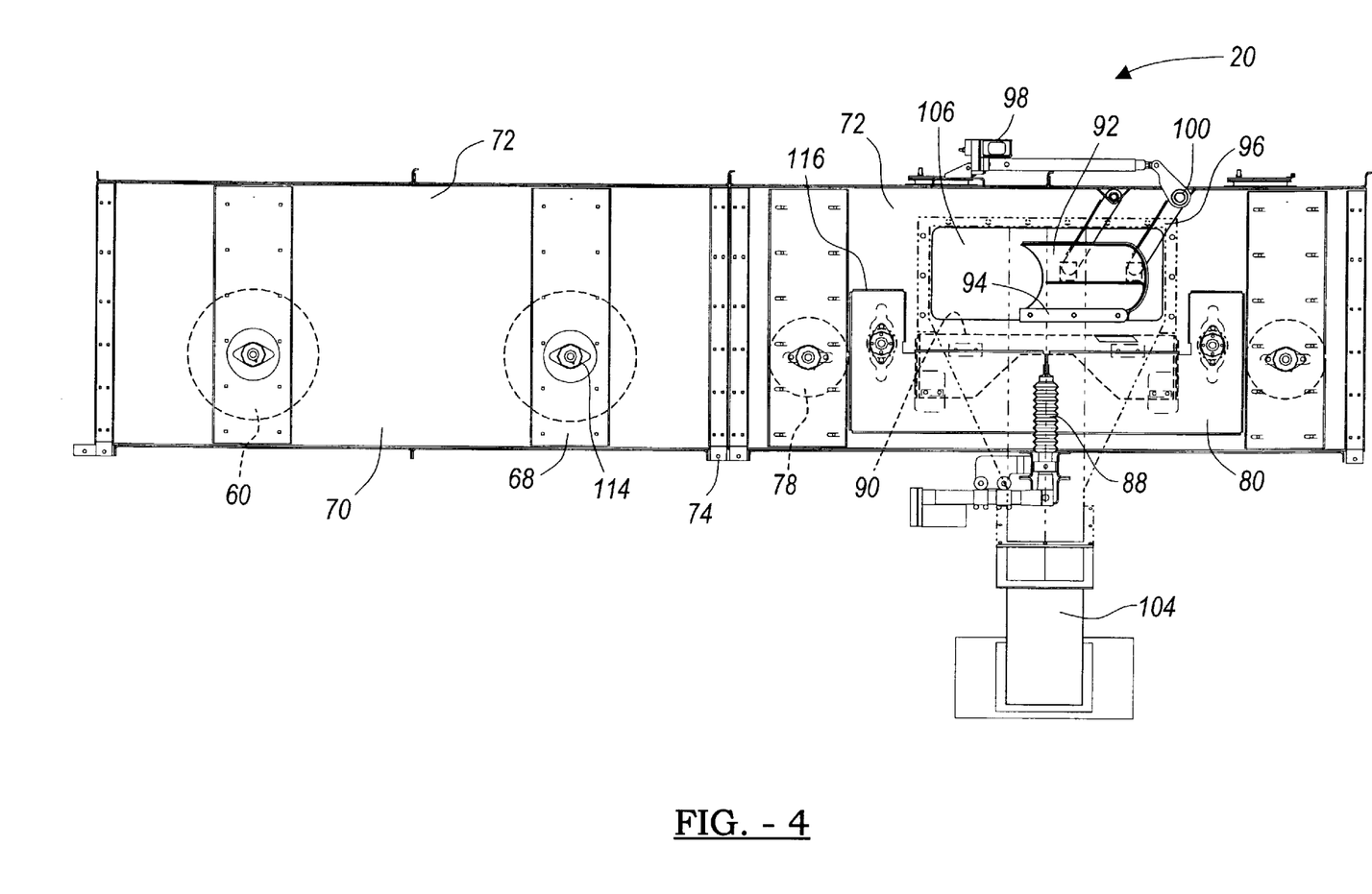
FIG. 4 is an enlarged side elevational view of the intermediate discharge section according to the teachings of the present invention.
Figure 4A:
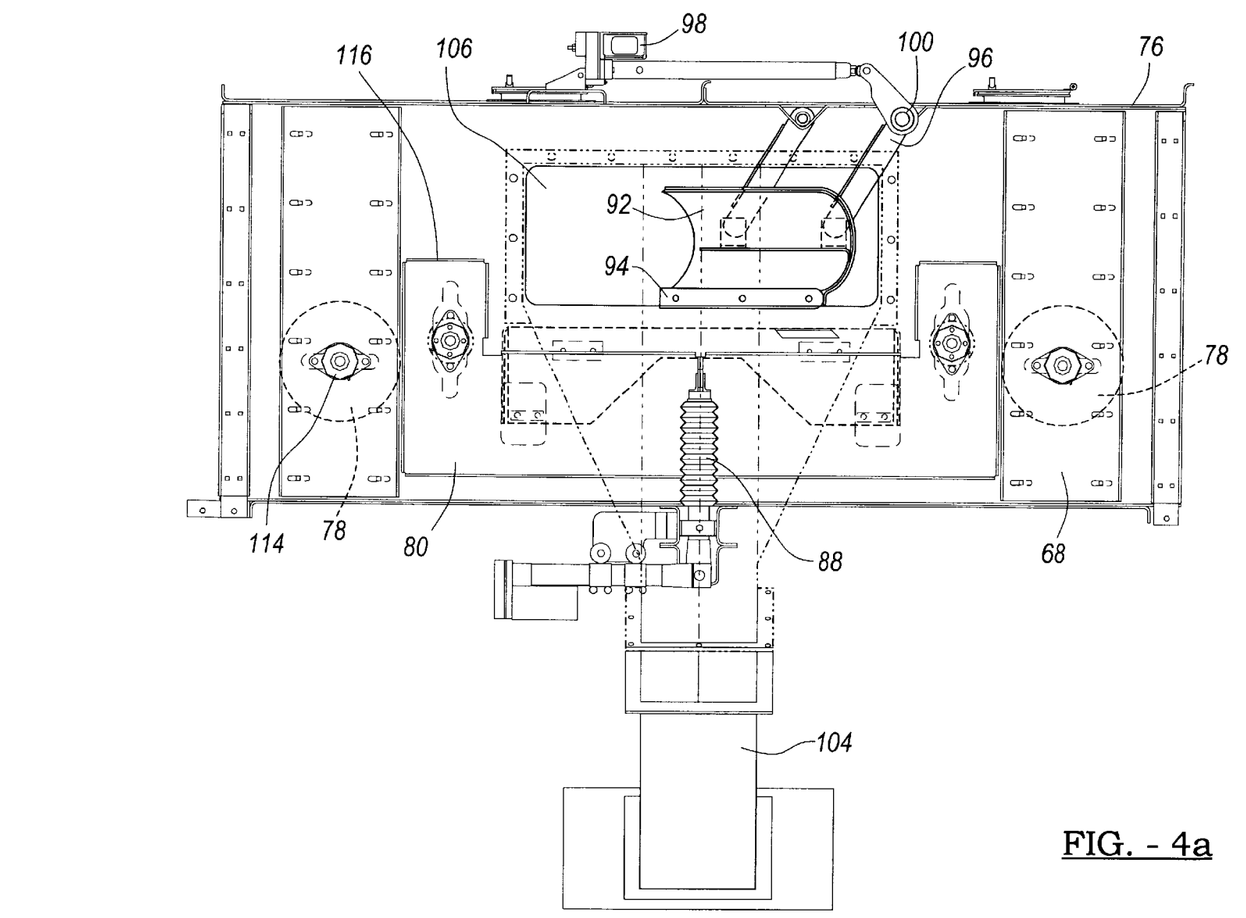
FIG. 4a is an enlarged side elevational view of a portion of the intermediate discharge section according to the teachings of the present invention.
Figure 5:
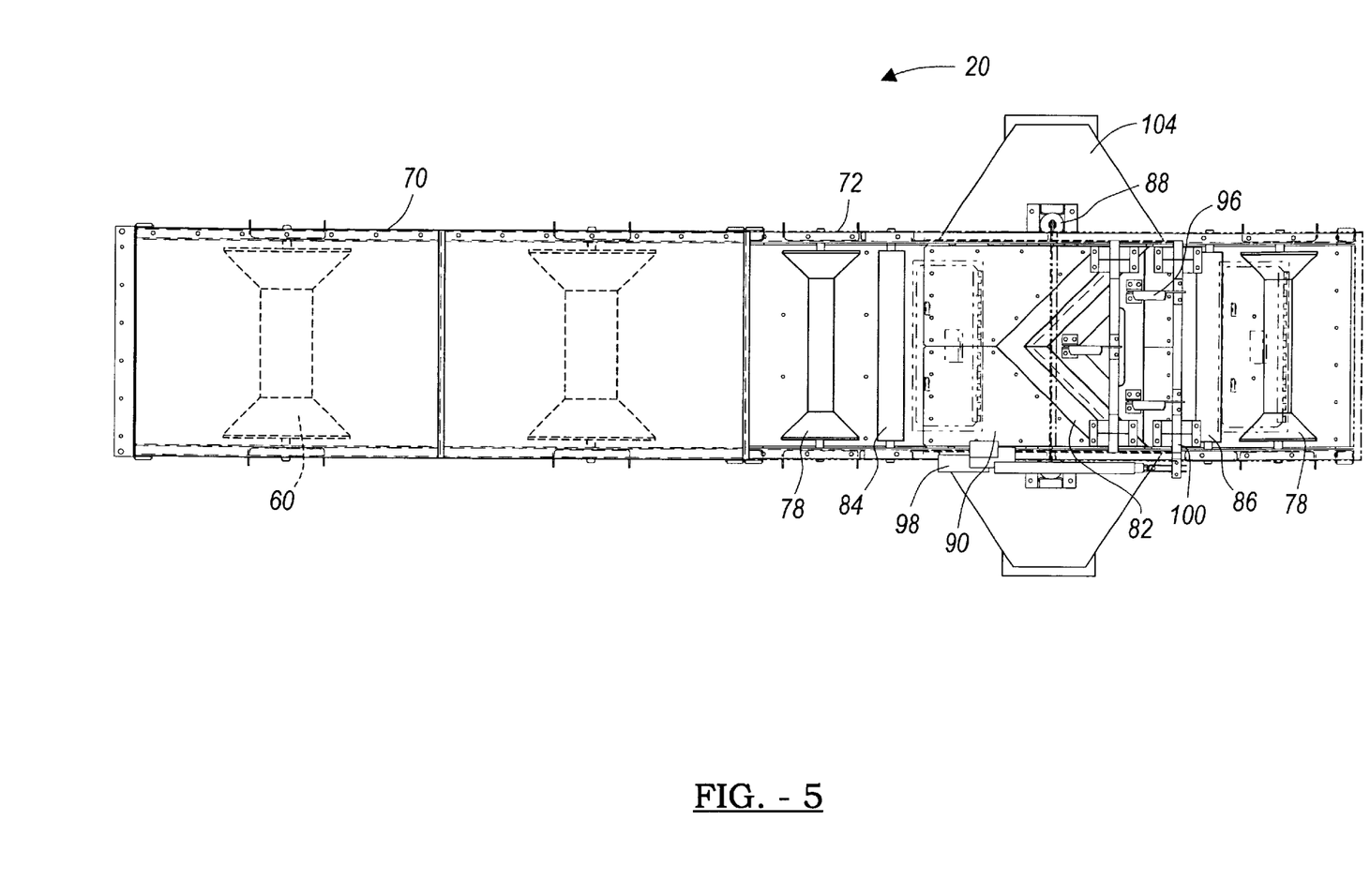
FIG. 5 is an enlarged top view of the intermediate discharge section according to the teachings of the present invention.
Figure 5A:
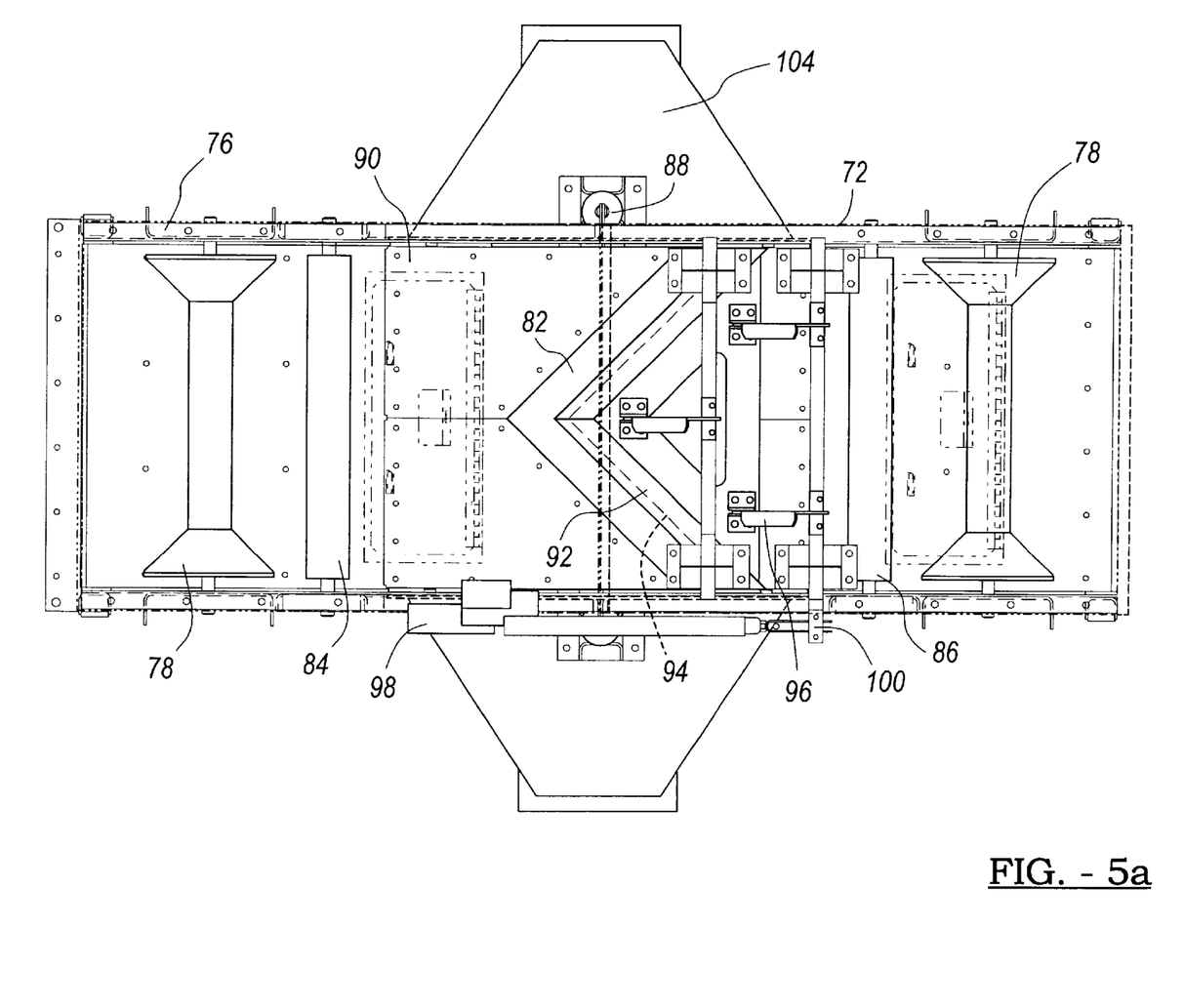
FIG. 5a is an enlarged top view of a portion of the intermediate discharge section according to the teachings of the present invention.
Figure 6:
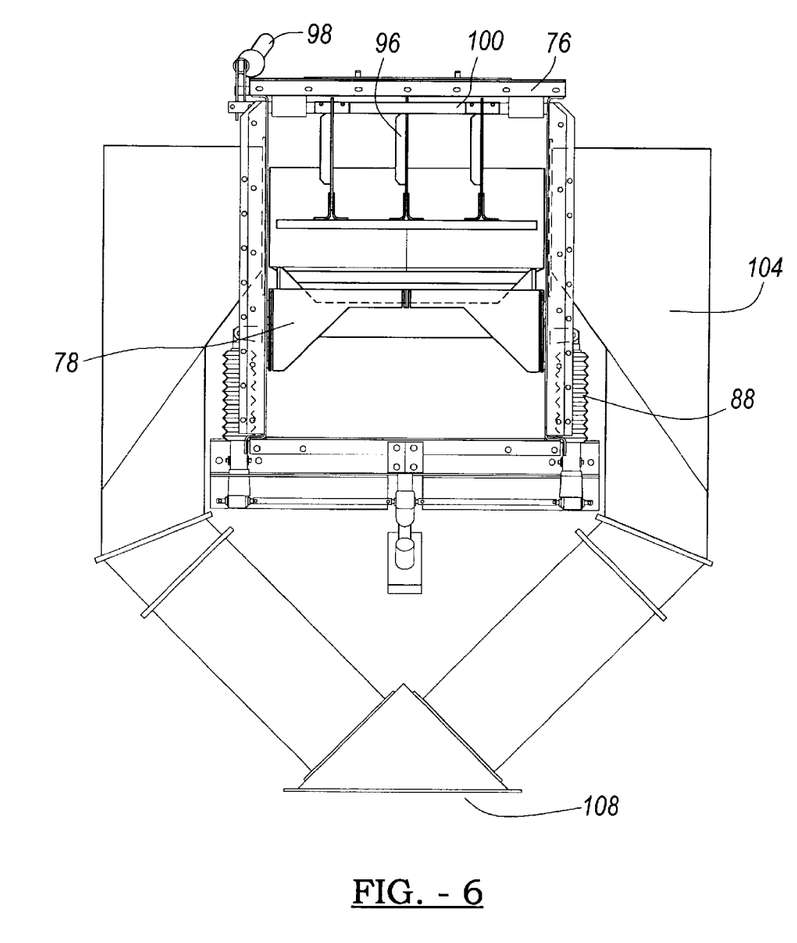
FIG. 6 is an enlarged end view of the intermediate discharge section according to the teachings of the present invention.
Figure 7:
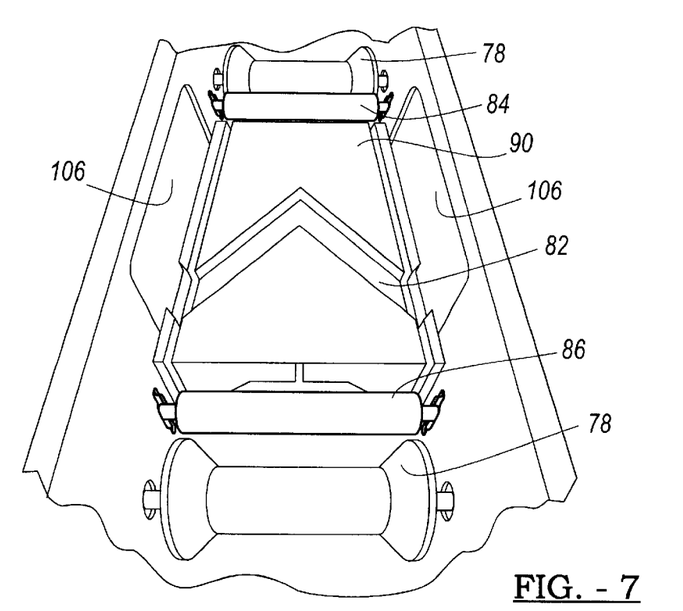
FIG. 7 is a top perspective view of a portion of the intermediate discharge section according to the teachings of the present invention.

The intermediate discharge section 20 is preferably sixteen feet (16') in length, twice as long as the standard intermediate section 28. The intermediate discharge section 20 consists of a first intermediate discharge section 70 and a second intermediate discharge section 72 joined by an abutting joint 74. The intermediate discharge section 20 is housed within a housing 76 which provides additional height for the intermediate discharge mechanism, further discussed herein, when the conveyor belt 32 is raised during operation. The first intermediate discharge section 70 includes a pair of idler pulleys 60, each attached to a bearing stiffness plate 68 and positioned about four feet (4') apart as with the intermediate sections 28. Here again, the bearing stiffness plate 68 enable the idler pulleys 60 to be adjusted fore and aft for belt training purposes. It should further be noted that the idler pulleys 60 are the same size and shape as the other idler pulleys 60 throughout the conveyor assembly, thereby providing a full belt cross section such that the conveyor capacity is not reduced through the intermediate discharge section 20.

The second intermediate discharge section 72 is used to transition the conveyor belt 32 from the standard full concave cross section to a lesser concave cross section. This is accomplished by a pair of leading and trailing edge transition idler pulleys 78, which are again attached to bearing stiffness plates 68, enabling fore and aft adjustment of the transition idler pulleys 78. The transition idler pulleys 78 have a shallower profile as compared to a standard pulleys 60 (see FIG. 5), thereby providing a shallower concave cross section to the conveyor belt 32. Positioned between the transition idler pulleys 78 is a plow support frame 80 having a plow support frame platform 90 which is preferably covered with an ultra high molecular polyethylene and defines a substantially V-shaped opening 82, further discussed herein. The conveyor belt 32 passes over the plow support frame platform 90 when the intermediate discharge section 20 is deactivated to allow the grain 12 to pass by this discharge location or any immediate location 18, to continue to a subsequent intermediate discharge or a discharge from the head section 24 of the conveyor assembly 10. The second intermediate discharge section 72 also includes a leading flat roller 84 and a trailing flat roller 86, which are employed to force the conveyor belt 32 into a flat configuration when an intermediate discharge is desired.

The operation of the intermediate discharge section is shown in FIGS. 8a–8e, with the conveyor belt 32 not shown for clarity. In use, the plow support frame 80 is normally in a "down" position when the intermediate discharge is deactivated (see FIG. 8a). In this location, the conveyor belt 32 rides atop the idler pulleys 60 and transition idler pulleys 78, thereby maintaining the concave cross section of the conveyor belt 32 to transport the grain 12 through the intermediate discharge section 20. Once activated, the plow support frame 80, along with the leading flat roller and trailing flat roller 86 are raised to the "up" position with a pair of synchronized linear actuators 88 (see FIG. 8b) or manually actuated. In the "up" position, the leading flat roller 84 and trailing flat roller 86 which are attached to the plow support frame 80 supports the conveyor belt 32 and forces the conveyor belt 32 into a flat profile. At this point of operation, the conveyor belt 32 is also supported by the plow support frame platform 90.

Figure 8A:
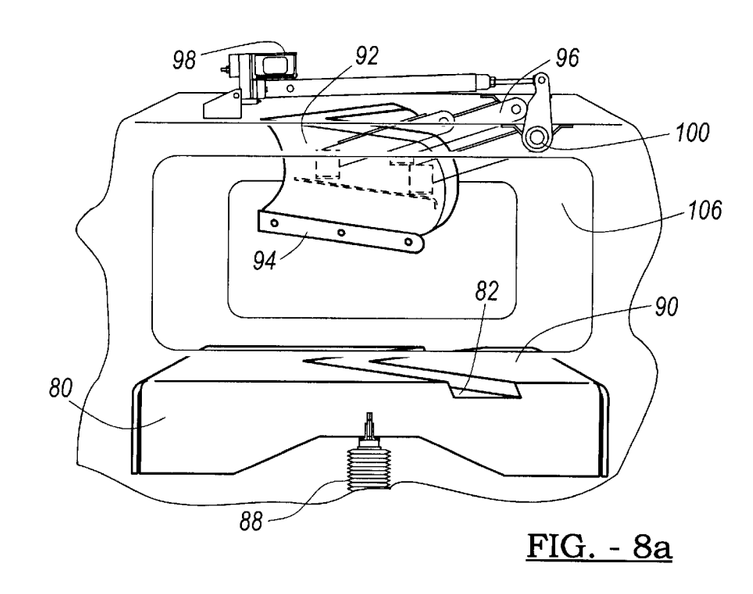
FIGS. 8a–8e illustrate perspective views of the intermediate discharge section in operation.
Figure 8B:
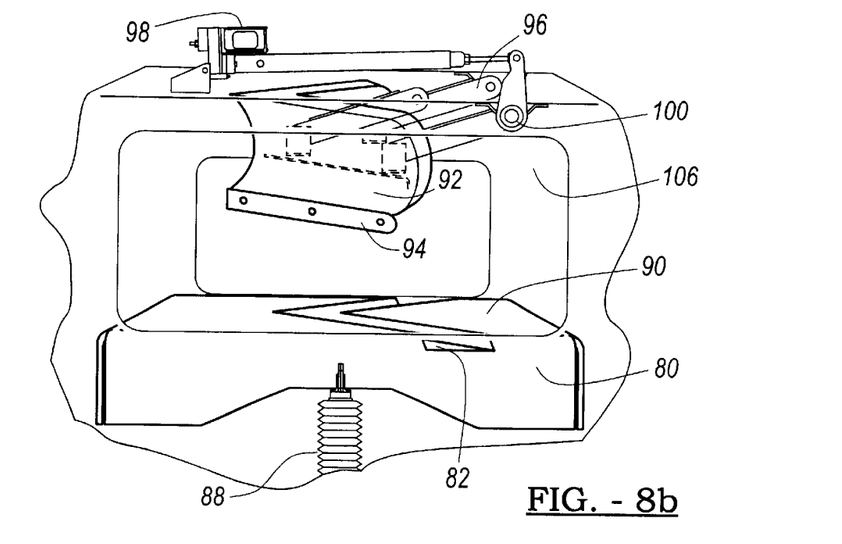
Figure 8C:
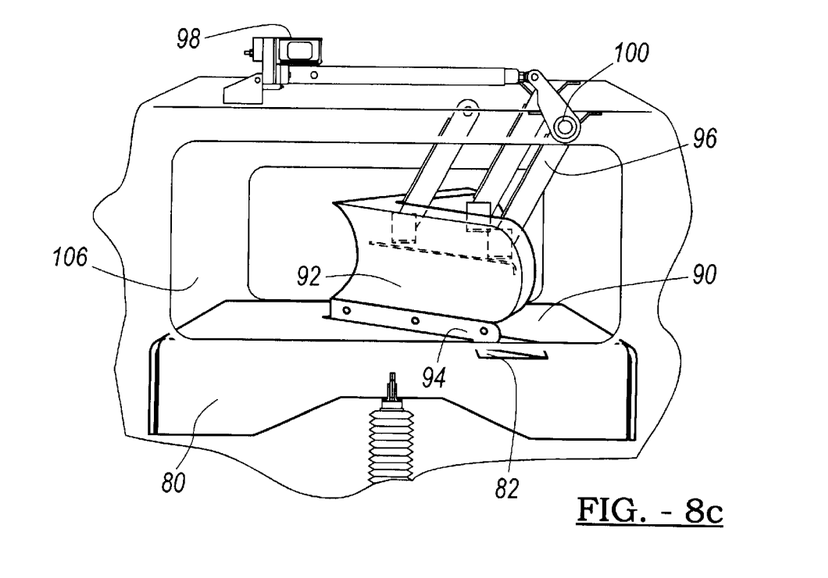
Figure 8D:
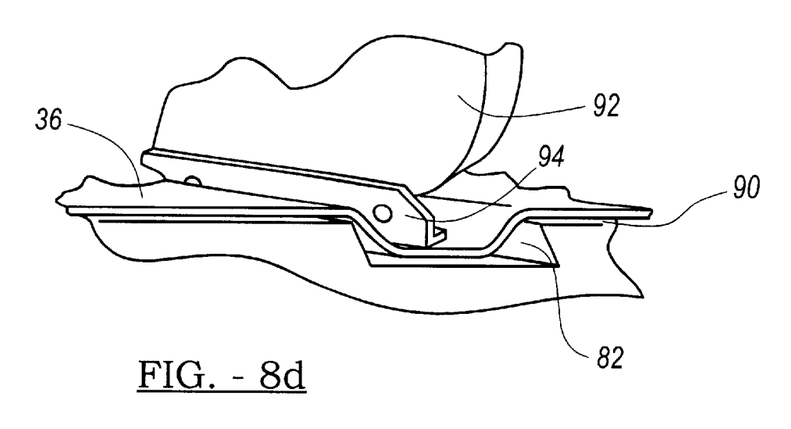

Next, a V-shaped plow 92 formed from steel, lined with ultra high molecular weight polyethylene, or similar material used to extend the life of the plow, having a hardened steel edge 94 is lowered by three (3) parallel linkage arms 96 that are attached to the top of the housing 76 (see FIG. 8c). A mechanical actuator 98, such a pneumatic or hydraulic cylinder or a manual lever may be used to rotate a shaft 100 connected to the parallel linkage arms 96. The mechanical actuator 98 may also be equipped with limit switches to accurately position the plow height. With the edge 94 of the plow 92 lowered into contact with the top of the conveyor belt 32, pressure is exerted on the conveyor belt 32 by the plow weight (see FIG. 8d). It should be noted that spring mechanisms or other weights can also be used or applied to the plow 92 to insure that the plow 92 rides or "floats" atop the conveyor belt 32. The plow 92 "floats" atop the conveyor belt 32 by way of slotted holes 102 (see FIG. 8e) positioned within the parallel linkages 96 that connect the plow 92 to the linkages 96.

Figure 8E:
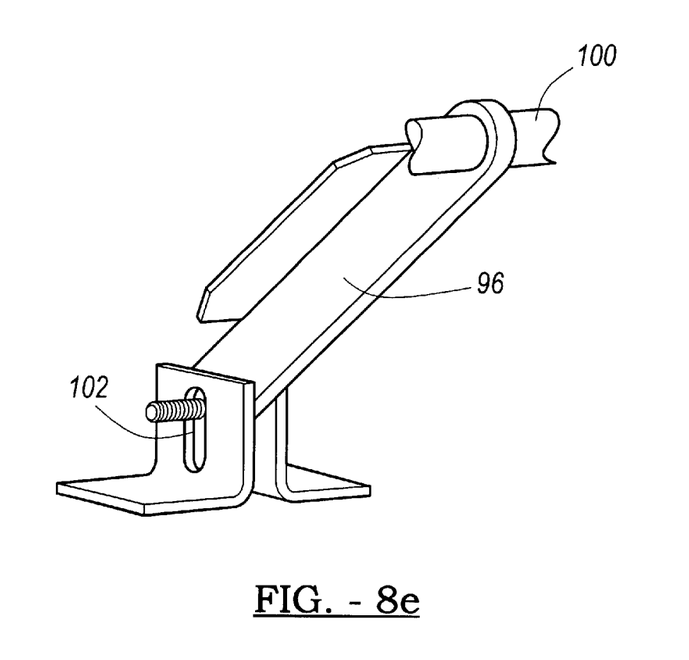

The down pressure applied by the plow 92 is able to substantially completely remove all material and product from the conveyor belt 32 because of this floating feature and because of the V-shaped groove 82 defined within the plow support frame platform 90. In this regard, by providing an opening or groove 82 which substantially corresponds to the plow shape 92, the conveyor belt 32 is able to flex in this region, thereby insuring that the edge 94 of the plow 92 rides substantially atop the entire conveyor belt 32 to insure complete discharge of the granular material. Moreover, by having the plow support frame platform 90 synchronized in movement, via the pair of synchronized linear actuators 88, this insures that the plow 92 and plow support frame 90 are flat in contact with one another so that substantially all the granular material 12 is removed from the belt 32. As such, in the "up" position, when pressure is exerted on the conveyor belt 32, the conveyor belt 32 will contact the plow support frame platform 90, which includes the ultra high molecular weight polyethylene liner, while the conveyor belt 32 rides atop the leading flat roller 84 and trailing flat roller 86, which are elevated above the transition idler pulleys 78, thereby removing the support of the transition idler pulleys 78 from the conveyor belt 32. It should also be noted that the plow 92 can be deployed onto either an empty conveyor belt 32 or a conveyor belt 32 containing the granular material 12, without any adverse effect to the conveyor belt 32.

As the plow 92 rides atop the conveyor belt 32, the grain 12 is deflected from the curved plow 92 which rolls and propels the grain 12 from the blade edge 94. This curved or arcuate profile is superior to conventional straight profile plows such that the grain 12 is propelled by the constant motion of the conveyor belt 32 passing under the plow blade 94. The grain 12 deflected from the plow 92 is discharged and channeled into side discharge chutes 104, which receive the grain 12 through openings 106 in the side of the second intermediate discharge section 72. The side discharge chutes 104 deliver the granular material 12 to an outlet 108 for subsequent delivery to the intermediate location 18. The side discharge chutes 104 are also lined with ultra high molecular weight polyethylene or other appropriate material to provide extended life to the metal housing of the discharge chutes 104. It should further be noted that by providing a pair of openings 106 on either side of the V-shaped plow 96, this provides an even distribution force to the conveyor belt 32, thereby preventing the-conveyor belt 32 from being forced to one side or the other, which commonly occurs with a single angled plow system. Additionally, this enables the side discharge chutes 104 to only extend out slightly from the conveyor assembly 10 on either side of the conveyor assembly 10 because each discharge chute only receives about half or a portion of the grain 12, thereby providing for a more compact design of the intermediate discharge section 20.

When the intermediate discharge is deactivated, the reverse procedure occurs. In this regard, the plow 92 raises out of the grain flow area and the plow support frame 80 lowers to the "down" position, such that the conveyor belt 32 now rides atop the leading or trailing transition idler pulleys 78 providing for a substantially concave cross section to carry the grain 12 through the intermediate discharge section 20.

Returning to FIG. 2, the plow 92 may also be repositioned to accommodate for product flow coming from the opposite direction along the conveyor belt 32 so that the conveyor assembly can accommodate bi-directional movement of the conveyor belt 32. In this regard, the plow 92, parallel linkage arms 96, actuator 98 and shaft 100 may simply be reversed along with the plow support frame platform 90 to accommodate for a reversed granular material flow, along conveyor belt 32. Alternatively, the plow 92 can be configured to provide for bi-directional movement of the conveyor belt 32 by simply providing a plow 129, which is substantially diamond shaped to accommodate for granular flow in either direction. Here again, the plow 129 may simply be connected to the parallel linkage members 96 and raised and lowered as previously described to provide two (2) opposed plow faces 110 and 112. Likewise, a diamond shaped groove (not shown) can simply be used in place of the V-shaped groove 82 to accommodate for the configuration of the blade 129. In this way, the conveyor belt 32 may be driven in a first direction or a second direction while providing an intermediate discharge without having to provide further reconfiguration of the intermediate discharge section 20.

The intermediate discharge section 20 therefore provides an intermediate discharge capability which may be retrofitted to existing conveyor assemblies and provides a configuration which is lower in profile that existing systems. This lower and narrower profile enables multiple intermediate discharge outlets to be positioned adjacent to one another should this be desired. The intermediate discharge section 20 may also be configured to handle bi-directional movement of the conveyor belt 32, as opposed to existing stepped intermediate sections which cannot be configured in this fashion. The intermediate discharge section 20 also provides a shaped plow 20, which is lined and curved to provide a propelled motion of the grain 12, thereby exhibiting superior displacement of granular material 12 out of openings 106. The floating plow 92, via the slots 102 and the V-shaped groove 82 also enables substantially all of the granular material 12 to be removed from the conveyor belt 32 when the intermediate discharge section 20 is put into use. The intermediate discharge section 20 is also generally formed from a galvanized steel that essentially bolts to existing conveyor assemblies and provides the features of external mounted bearings 114 and actuators 88 and 98, which are not exposed to contaminants or other dust within the conveyor assembly, along with a dust seal 116 which seals the moveable plow support frame 80 relative to the housing 76 upon moving up or down. It should further be noted that each external mounted bearing 114 will also include a polymer seal between the bearing and the housing 76, as set forth in U.S. Ser. No. 09/099,971, filed Jun. 19, 1998, entitled "idler Pulley For A Conveyor Assembly", hereby incorporated by reference.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An intermediate discharge assembly to remove granular material from a conveyor belt used in a roller belt conveyor assembly, said intermediate discharge assembly comprising:
    a first pair of leading and trailing pulleys, said first pair of leading and trailing pulleys operable to support the conveyor belt in a substantially concave manner;
    a second pair of leading and trailing pulleys, said second pair of leading and trailing pulleys operable to support the conveyor belt in a substantially flat manner;
    a plow support frame platform having a support surface defining a V-shaped groove and being positioned between said second pair of leading and trailing pulleys; and
    a V-shaped plow positioned between said first and second pairs of leading and trailing pulleys, said V-shaped plow operable to remove the granular material from the conveyor belt, wherein when said first pair of leading and trailing pulleys supports the conveyor belt, said V-shaped plow is elevated above said conveyor belt, whereby said granular material passes through said intermediate discharge assembly, wherein when said second pair of leading and trailing pulleys and said support surface of said plow support frame platform supports the conveyor belt, said V-shaped plow is positioned atop the substantially flat conveyor belt and within said V-shaped groove, whereby the granular material is removed from the conveyor belt.

2. The intermediate discharge assembly as defined in claim 1 wherein each of said first pair of leading and trailing pulleys includes a first conically tapered end and a second conically tapered end to support the conveyor belt in a substantially concave manner.

3. The intermediate discharge assembly as defined in claim 1 wherein each of said second pair of leading and trailing pulleys is substantially cylindrical in shape to support the conveyor belt in a substantially flat manner.

4. The intermediate discharge assembly as defined in claim 1 wherein when said second pair of leading and trailing pulleys supports the conveyor belt, said second pair of leading and trailing pulleys is elevated above said first pair of leading and trailing pulleys and said plow is lowered atop the substantially flat conveyor belt.

5. The intermediate discharge assembly as defined in claim 1 wherein said plow support frame platform is operable to be located in a first position and a second position and operable to support the conveyor belt substantially transversely across the entire conveyor belt with said support surface.

6. The intermediate discharge assembly as defined in claim 5 wherein said second pair of leading and trailing pulleys moves from said first position to said second position with said plow support frame.

7. The intermediate discharge assembly as defined in claim 5 wherein said plow support frame platform defines an opening corresponding to an edge of said plow to enable said plow to substantially remove all of said granular material from the conveyor belt.

8. The intermediate discharge assembly as defined in claim 1 wherein said plow floats atop the conveyor belt.

9. An intermediate discharge assembly to remove granular material from a conveyor belt used in a roller belt conveyor assembly, said intermediate discharge assembly comprising:
    a first pair of leading and trailing pulleys, said first pair of leading and trailing pulleys operable to support the conveyor belt in a substantially concave manner;
    a second pair of leading and trailing pulleys, said second pair of leading and trailing pulleys operable to support the conveyor belt in a substantially flat manner; and
    a plow positioned between said first and second pairs of leading and trailing pulleys, said plow operable to be moved from a first position to a second position by parallel linkages coupled to said plow, said plow operable to remove the granular material from the conveyor belt, wherein when said first pair of leading and trailing pulleys supports the conveyor belt, said plow is elevated above said conveyor belt, whereby said granular material passes through said intermediate discharge assembly, wherein when said second pair of leading and trailing pulleys supports the conveyor belt, said plow is positioned atop the substantially flat conveyor belt, whereby the granular material is removed from the conveyor belt.

10. The intermediate discharge assembly as defined in claim 1 further comprising a discharge chute positioned on a first side and a second side of said plow.

11. An intermediate discharge assembly to remove granular material from a conveyor belt used in a roller belt conveyor assembly, said intermediate discharge assembly comprising:
    a plow support frame platform positioned below the conveyor belt, said plow support frame platform operable to be located in a first position and a second position, said plow support frame platform defining an opening corresponding to an edge of said plow; and said V-shaped plow positioned above the conveyor belt, said V-shaped plow operable to be located in a first position and a second position, wherein when said plow support frame platform and said V-shaped plow are each located in said first position, the conveyor belt passes over said plow support frame platform and the granular material passes through said intermediate discharge assembly, wherein when said plow support frame platform and said V-shaped plow are each located in said second position, said plow support frame platform is elevated from said first position to substantially support the conveyor belt as the conveyor belt slidably engages and rides atop a surface of said plow support frame platform and over said opening and said V-shaped plow is lowered atop the conveyor belt and said opening to substantially remove the granular material from the conveyor belt.

12. The intermediate discharge assembly as defined in claim 11 wherein when said plow support frame platform and said plow are located in said first position, said conveyor belt has a substantially concave cross-sectional shape to carry the granular material.

13. The intermediate discharge assembly as defined in claim 11 wherein said surface of said plow support platform frame includes a polymer surface liner and when said plow support frame platform and said plow are each located in said second position, said plow support frame platform supports the conveyor belt in a substantially flat manner transversely across substantially the entire conveyor belt and the conveyor belt slidably rides atop said polymer surface liner.

14. The intermediate discharge assembly as defined in claim 11 wherein said V-shaped plow substantially disburses the granular material from a first side and a second side of said plow.

15. The intermediate discharge assembly as defined in claim 14 wherein said plow has a substantially arcuate cross-sectional profile to roll and propel the granular material from said plow.

16. An intermediate discharge assembly to remove granular material from a conveyor belt used in a roller belt conveyor assembly, said intermediate discharge assembly comprising:

a plow support frame platform positioned below the conveyor belt, said plow support frame platform operable to be located in a first position and a second position; and a plow positioned above the conveyor belt and coupled to a parallel linkage assembly, whereby said parallel linkage assembly enables said plow to substantially float atop the conveyor belt, said plow operable to be located in a first position and a second position, wherein when said plow support frame platform and said plow are each located in said first position, the conveyor belt passes over said plow support frame platform and the granular material passes through said intermediate discharge assembly, wherein when said plow support frame platform and said plow are each located in said second position, said plow support frame platform is elevated from said first position to substantially support the conveyor belt and said plow is lowered atop the conveyor belt to substantially remove the granular material from the conveyor belt.

17. The intermediate discharge assembly as defined in claim 11 wherein said plow support frame platform defines an opening corresponding to an edge of said plow.

18. The intermediate discharge assembly as defined in claim 11 further comprising a first pair of leading and trailing pulleys, said first pair of leading and trailing pulleys operable to support the conveyor belt in a substantially concave manner when said plow support frame platform and said plow are located in said first position and a second pair of leading and trailing pulleys operable to support the conveyor belt in a substantially flat manner when said plow support frame platform and said plow are located in said second position.

19. An intermediate discharge assembly to remove granular material from a conveyor belt used in a roller belt conveyor assembly, said intermediate discharge assembly comprising:

a plow support frame platform positioned below the conveyor belt, said plow support frame platform operable to be located in a first position and a second position; and a plow positioned above the conveyor belt, and being a bi-directional plow operable to enable the conveyor belt to be moved in a first direction and a second direction, said plow operable to be located in a first position and a second position, wherein when said plow support frame platform and said plow are each located in said first position, the conveyor belt passes over said plow support frame platform and the granular material passes through said intermediate discharge assembly, wherein when said plow support frame platform and said plow are each located in said second position, said plow support frame platform is elevated from said first position to substantially support the conveyor belt and said plow is lowered atop the conveyor belt to substantially remove the granular material from the conveyor belt.

20. An intermediate discharge assembly to remove granular material from a conveyor belt used in a roller belt conveyor assembly, said intermediate discharge assembly comprising:

a plow support frame platform positioned below the conveyor belt, said plow support frame platform operable to be located in a first position and a second position; and a plow positioned above the conveyor belt and including opposed V-shaped plow members, said plow operable to be located in a first position and a second position, wherein when said plow support frame platform and said plow are each located in said first position, the conveyor belt passes over said plow support frame platform and the granular material passes through said intermediate discharge assembly, wherein when said plow support frame platform and said plow are each located in said second position, said plow support frame platform is elevated from said first position to substantially support the conveyor belt and said plow is lowered atop the conveyor belt to substantially remove the granular material from the conveyor belt.

21. A method to remove granular material at an intermediate location along a conveyor belt used in a roller belt conveyor assembly, said method comprising:

locating the conveyor belt at a first position to enable the granular material to pass by the intermediate location;

elevating the conveyor belt to a second position at the intermediate location to permit removal of the granular material at the intermediate location by elevating a plow support frame platform that defines a V-shaped groove to locate the conveyor belt in the second position;

slidably engaging a surface of the plow support frame platform with the conveyor belt to slidably support the conveyor belt with the plow support frame platform; and lowering a V-shaped plow atop the conveyor belt and the groove defined by the V-shaped plow support frame platform when the conveyor belt is located in the second position to discharge the granular material at the intermediate location.

22. The method as defined in claim 21 further comprising lowering a plow atop the conveyor belt when the conveyor belt is located in the second position to discharge the granular material at the intermediate location.

23. The method as defined in claim 21 further comprising supporting the conveyor belt with a first pair of leading and trailing pulleys when the conveyor belt is located in the first position, whereby the conveyor belt is supported in a substantially concave manner and positioning a second pair of leading and trailing pulleys to locate the conveyor belt in the second position, whereby the second pair of leading and trailing pulleys supports the conveyor belt in a substantially flat manner.

24. The intermediate discharge assembly as defined in claim 1, wherein the roller belt conveyor assembly is an enclosed roller belt conveyor assembly.

25. The intermediate discharge assembly as defined in claim 9, wherein the roller belt conveyor assembly is an enclosed roller belt conveyor assembly.

26. The intermediate discharge assembly as defined in claim 11, wherein the roller belt conveyor assembly is an enclosed roller belt conveyor assembly.

27. The intermediate discharge assembly as defined in claim 21, wherein the roller belt conveyor assembly is an enclosed roller belt conveyor assembly.

* * * * *